United States Patent
Altmann et al.

(12)

(10) Patent No.: US 6,781,073 B1
(45) Date of Patent: Aug. 24, 2004

(54) ADJUSTABLE SWITCH FOR A MOTOR VEHICLE BRAKE LIGHT

(75) Inventors: Markus Altmann, Bankholzen (DE); Zdenek Pavlis, Singen (DE)

(73) Assignee: TRW Automotive Electronics & Components GmbH & Co. KG (DE)

( * ) Notice: Subject to any disclaimer, the term of this patent is extended or adjusted under 35 U.S.C. 154(b) by 0 days.

(21) Appl. No.: 09/890,473

(22) PCT Filed: Jan. 24, 2000

(86) PCT No.: PCT/DE00/00192

§ 371 (c)(1),
(2), (4) Date: Feb. 6, 2002

(87) PCT Pub. No.: WO00/48213

PCT Pub. Date: Aug. 17, 2000

(30) Foreign Application Priority Data

Feb. 12, 1999 (DE) .......................................... 199 06 036

(51) Int. Cl.[7] ................................................ H01H 3/14
(52) U.S. Cl. ............................. 200/61.89; 200/61.58 R; 200/61.86; 200/61.87; 200/61.88
(58) Field of Search ....................... 200/61.89, 61.58 R, 200/61.86, 61.87, 61.88, 61.76, 16

(56) References Cited

U.S. PATENT DOCUMENTS

| | | | | | |
|---|---|---|---|---|---|
| 4,297,550 A | * | 10/1981 | Leighton | .................. | 200/61.89 |
| 4,604,506 A | | 8/1986 | Gebhardt | | |
| 5,929,407 A | * | 7/1999 | Ziem | ........................ | 200/61.89 |

FOREIGN PATENT DOCUMENTS

| | | |
|---|---|---|
| DE | 32 30 414 C3 | 8/1982 |
| DE | 196 03 135 C1 | 1/1996 |
| DE | 196 45 058 C1 | 10/1996 |

* cited by examiner

Primary Examiner—Elvin Enad
Assistant Examiner—Jennifer A. Poker
(74) Attorney, Agent, or Firm—Fay, Sharpe, Fagan, Minnich & McKee, LLP

(57) ABSTRACT

A switch 2 is provided, especially a motor vehicle brakelight switch, which can be actuated by a switch element 1, whereby an adjustment device 3 is arranged between switch 2 and the switch element 1. The adjustment device is designed as lever arm which is connected on one side with the switch element 1 and on the other side with an actuating part 20 of switch 2.

20 Claims, 2 Drawing Sheets

ADJUSTABLE SWITCH FOR A MOTOR VEHICLE BRAKE LIGHT

BACKGROUND OF THE INVENTION

1. Field of the Invention

The present invention relates to electrical switches, and, more particularly to an adjustable switch for use with motor vehicle brake light systems. The switch is actuated by an associated mechanical switching element, such as the brake pedal of an associated vehicle. The switch includes an adjustment device arranged between the electrical switch and the associated mechanical switching element. Although the invention finds particular application in conjunction with a brake light switch, and will be described with particular reference thereto, it is to be appreciated that the present invention is also useful in other like applications.

2. Discussion of the Art

Several prior art patents teach the use of self-adjusting tappet switches for automotive applications such as, for example, German patents DE 32 30 414 C3, DE 196 03 135 C1, and DE 196 45 058 C1. However, the disclosed switches are relatively complicated in their design and usually have an adjustment device comprising a specially shaped rod and a cooperative locking pawl unit.

The present invention presents an improvement over the complicated prior art switch designs, by providing superior adjustment properties coupled with a simple construction.

SUMMARY OF THE INVENTION

In accordance with one aspect of the present invention, an adjustment device comprises a lever arm which is connected on one side with an associated mechanical switch element, and on the other side with an actuating part of an electrical switch. The lever arm has a simple construction which however provides reliable adjustment of the switch relative to the associated switching element. Preferably, the actuating part is a spring-loaded rod component of the switch. Preferably, the lever arm is made of wire and includes at least one loop formed around the spring-loaded rod.

The lever arm may include several loops formed around the spring-loaded rod to form a connection between the lever and the rod. The connection may be either a positive direct connection or a non-positive indirect connection such as a frictional lock.

In accordance with another aspect of the present invention, a rod is connected with a spring-loaded switching lever, whereby the switching operation of at least one contact of a switch is controlled. The rod is preferably a plastic rod. The rod further preferably includes several shoulders and has an attachment region for attaching with the switching lever. The rod preferably also has at least one stop for limiting the rotation of the rod relative to the switch body.

Preferably, the at least one contact, the spring, the switching lever, and the rod are arranged at least partially inside of a housing. The spring advantageously provides a spring biasing force acting on a front side of the switching lever.

In accordance with yet another aspect of the present invention, a switching lever comprises a wire. The wire includes a portion which bends toward the associated switching element and is connected therewith in either a positive or a non-positive fashion. The connection may be made on either an upper or a lower side of the associated switching element, as desired based upon the shape of the bent region of the wire.

BRIEF DESCRIPTION OF THE DRAWINGS

The invention may take form in various components and arrangements of components, and in various steps and arrangements of steps. The drawings are only for the purposes of illustrating preferred embodiment and are not to be construed as limiting the invention.

DETAILED DESCRIPTION OF THE PREFERRED EMBODIMENT

Figure 1:
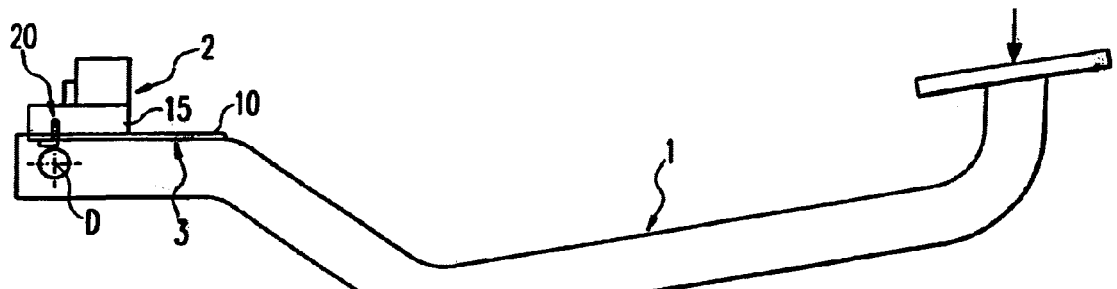
FIG. 1 is a side view of the switch coupled to an associated switching element in accordance with one embodiment of the present invention.
Figure 2:
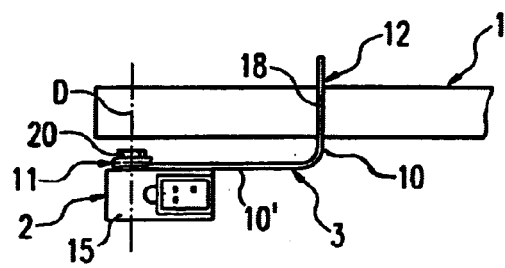
FIG. 2 is a top view of the switch and a portion of the associated switching element of FIG. 1.

With reference to FIGS. 1 and 2, an associated switching element 1 cooperates with a switch 2 through an adjustment device 3 whereby actuation of the switching element 1 actuates the switch 2 in an adjustable manner. In the preferred embodiment shown in FIGS. 1 and 2, the exemplary application is switching of an associated brake light (not shown) when the associated switching element 1, namely a brake pedal 1, is sufficiently pressed down.

Figure 3:
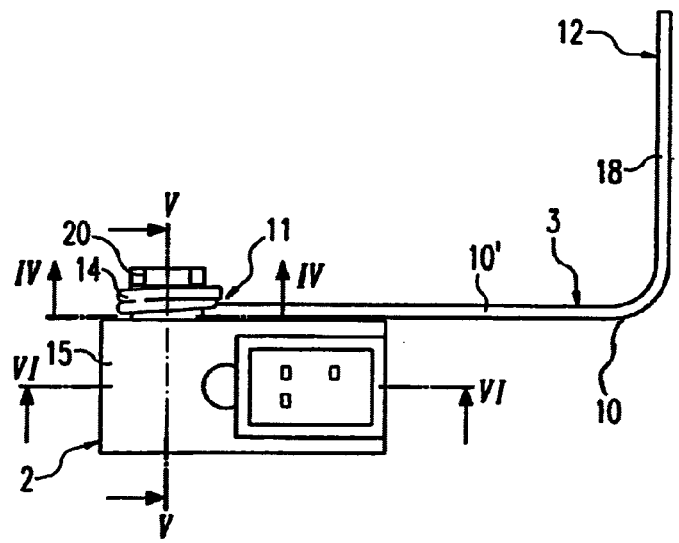
FIG. 3 is a top view of the switch, enlarged in comparison with FIG. 2.
Figure 4:
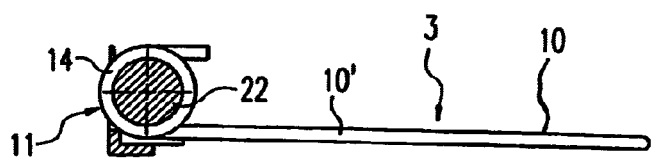
FIG. 4 is a sectional view taken along the line IV—IV of FIG. 3.

With reference to FIGS. 2–4, the adjustment device 3 includes a lever arm 10 which is connected on a first side 12 with the switching element 1, and which is connected on a second side 11 with an actuating part 20 of the switch 2. In the illustrated embodiment the lever arm 10 is made of a wire 10' that includes a bent region 18 on the first side 12 which faces the switching element 1. The bent region 18 is connected to the switching element 1, in either a positive or a non-positive manner. In the illustrated embodiment, the bent region 18 is pressed by spring-loading against the upper side of the switching element 1.

Of course, other arrangements of the lever arm 10 with respect to the switching element 1 are also contemplated. For example, the bent region 18 may be arranged below the switching element 1, or alternatively arranged either before or behind the fulcrum D (FIG. 1) of the brake pedal or switching element 1.

With continuing reference to FIGS. 1–4, the actuating part 20 is shown as an actuating rod 22. The wire 10' forms several loops or windings 14 around the actuating rod, as best seen in FIGS. 3 and 4. The windings 14 surround the actuating rod 22 and are in frictional contact therewith.

Figure 5:
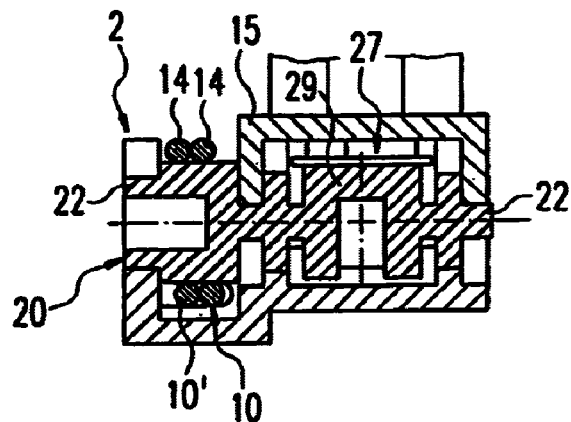
FIG. 5 is a sectional view taken along the line V—V of FIG. 3.
Figure 6:
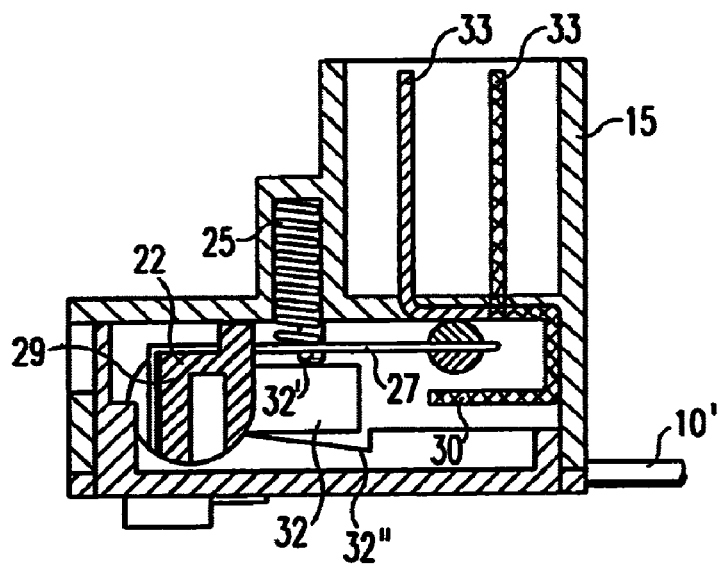
FIG. 6 is a sectional view taken along the line VI—VI of FIG. 3.
Figure 7:
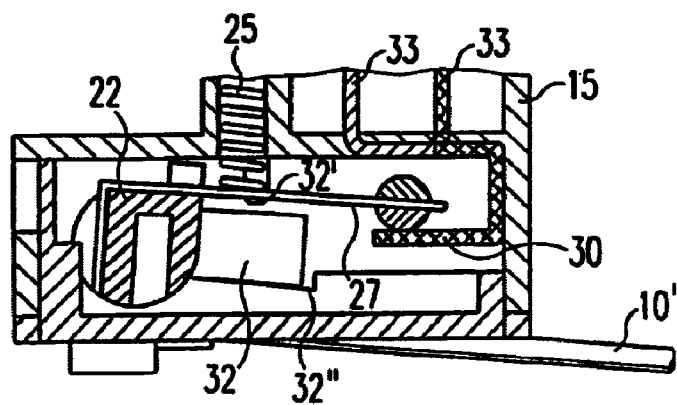
FIG. 7 is a sectional view taken along the line VI—VI of FIG. 3, similar to FIG. 6 except showing the case where the switch has been actuated.

With reference now to FIGS. 5–7, the actuating rod 22 preferably defines several shoulders, as best shown in FIG. 5. The actuating rod 22 is preferably made of plastic, although of course other materials may be substituted therefore as desired. As best illustrated in FIGS. 6 and 7, the actuating rod 22 is connected with a switch lever 27. The switch lever 27 is spring-loaded or biased by a spring 25. The combination of the actuating rod 22, spring 25, and switch lever 27 cooperate to control the electrical opening and closing of at least one contact 30 with contact pins 33 of the switch 2. Preferably, the switch 2 also includes a housing 15 in which are arranged, at least partially, the contact 30, the contact pins 33, the spring 25, the switch lever 27, and the actuating rod 22.

As seen in FIGS. 6 and 7, the actuating rod 22 includes several shoulders and has an attachment region 29 for attachment of the switch lever 27. The actuating rod 22 also has at least one stop 32 which cooperates with stops 32' and 32" of the housing 15 to limit rotational movement of the actuating rod 22. In the illustrated embodiment, the spring 25 is in compression and presses against the front side of the switch lever 27 to bias the switch lever 27 towards the position shown in FIG. 7.

The actuating rod 22 is spring-loaded by the spring 25 in cooperation with the switch lever 27, and the effect is transferred to the switching element 1 through the adjustment device 3 which in the illustrated embodiment includes the wire 10'.

By adjusting the position of the windings 14 of the adjustment element 3 relative to the actuating rod 22, a functionally correct adjustment of the electrical switch 2 relative to the mechanical switching element 1 is affected.

The switch operation will now be described with reference to FIGS. 1, 6, and 7. FIG. 6 shows the non-actuated position of switch 2, for which the brake pedal 1 is in the position shown in FIG. 1. As the brake pedal 1 is actuated by being depressed in the direction of the down-arrow shown in FIG. 1, the brake pedal 1 rotates relative to the switch 2 about fulcrum D. This movement is transferred via the adjustment device 3 to the switch 2 and the switch lever 27 is thereby rotated from the non-actuated position shown in FIG. 6 to the actuated position shown in FIG. 7.

As shown in FIG. 7, the switch lever 27 acts upon the contact 30 to activate the brake light. The rotational movement of the switch lever 27 is limited by abutment of the stop 32 of the actuating rod 22 against the lower stop 32" of the housing 15.

As the brake pedal is subsequently relieved of the downward depressing and therefore raises back up to the non-actuated position shown in FIG. 1, actuating rod 22 responds and the connection between the switch lever 27 and the contact 30 is broken and the brake light is deactivated. The stop 32 of the actuating rod 22 then abuts the upper stop 32' of the housing 15 according to FIG. 6.

All movements of the switching element 1, exemplified in the drawings by the brake pedal 1, are properly transferred via the adjustment element 3 to the switch 2. The invention provides a simple and individually adjustable interconnection between the electrical switch 2 and the mechanical switching element 1.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A switching apparatus for use with an associated motor vehicle brake-light system including a brake pedal member, the switching apparatus comprising:
   an electrical switch;
   an actuating part operatively connected to the electrical switch; and,
   an adjusting device arranged between the electrical switch and the associated brake pedal member, said adjusting device including a lever arm having a first end contacting the associated brake pedal member and having a second end connected with the actuating part by at least one loop formed by the second end of the lever arm wrapped around said actuating part.

2. A switch for use with an associated switching element, the switch comprising:
   a switch housing;
   a switch lever disposed within the switch housing;
   a contact disposed within the switch housing, the contact being actuated when the switch lever is in a first position, and the contact being non-actuated when the switch lever is in a second position;
   an actuating part disposed essentially within the switch housing and operatively connected with the switch lever;
   an adjustment device operatively connected between the actuating part and the associated switching element, the adjustment device being adjustable connected to the actuating part at an adjustable connection area, the adjustment device further being responsive to motion of the switching element for communicating said motion to the actuating part; and,
   a spring for biasing the switch lever, said spring further cooperating with the adjustment device through the actuating part to move the switch lever between the first position and the second position responsive to motion of the associated switching element.

3. The switch as set forth in claim 2, wherein:
   the adjustment device is a wire;
   the actuating part is an actuating rod; and,
   the adjustable connection area between the adjustment device and the actuating part includes at least one loop formed from a portion of the adjustment device wire that encompasses a portion of the actuating rod and is in frictional contact therewith.

4. The switch as set forth in claim 3, wherein the adjustable connection area is direct connection.

5. The switch as set forth in claim 3, wherein the actuating rod is made of plastic.

6. The switch as set forth in claim 3, wherein the actuating rod includes:
   an attachment region attached with the switch lever.

7. The switch as set forth in claim 6, wherein the actuating rod further includes a stop for limiting rotation of the actuating rod.

8. The switch as set forth in claim 3, wherein the spring is held in compression and presses against a front side of the switch lever.

9. The switch as set forth in claim 3, wherein the adjustment device is spring loaded against the associated switching element.

10. The switch as set forth in claim 9, wherein the spring loading is provided by the spring and is transmitted through the switch lever and the actuating part to the adjustment device.

11. The switch as set forth in claim 10, wherein the spring-loaded adjustment device presses against an upper side of the switching element.

12. The switch as set forth in claim 3, wherein the operative connection between the adjustment device and the associated switching element is a direct connection.

13. The switch as set forth in claim 3, wherein the associated switching element is a brake pedal of an associated motor vehicle.

14. An adjustable switch, comprising:
   a contact;
   an actuating member adapted to actuate the contact; and, a spring-loaded adjustment device arranged between the actuating member and an associated switching device, the adjustment device transmitting an action of the associated switching device to the actuating member whereby the contact is selectively actuated.

15. The adjustable switch as set forth in claim 14, further including a spring providing the spring-loading of said actuating member.

16. The adjustable switch as set forth in claim 14, wherein the adjustment device is a wire.

17. The adjustable switch as set forth in claim 16, wherein:

the actuating member includes an actuating rod; and, the wire is frictionally held to the actuating rod by several loops of the wire wrapped around an actuating rod and forming a frictional connection there between.

18. The adjustable switch as set forth in claim 17, wherein:

the wire is spring-loaded; and, the spring-loading of the wire is generated by the actuating member and is transmitted to the wire through the actuating rod .

19. The adjustable switch as set forth in claim 17, wherein the frictional lock is adjustable, whereby an adjustable coupling between the actuating member and the associated switching device is achieved.

20. The adjustable switch as set forth in claim 17, wherein the associated switching device is a brake pedal.

\* \* \* \* \*